Patented Feb. 27, 1923.

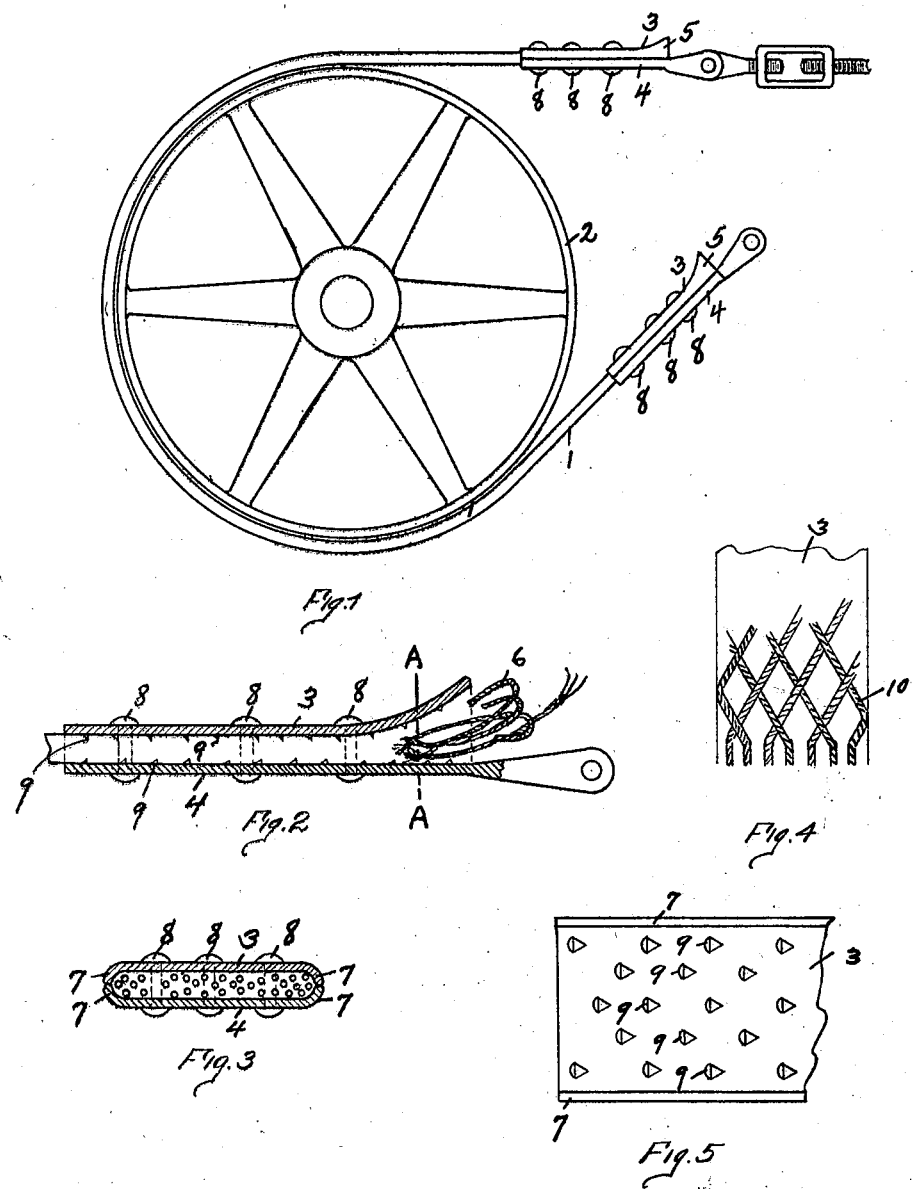

1,446,862

UNITED STATES PATENT OFFICE.

DANIEL THOMAS, OF YOUNGSTOWN, OHIO.

BELT FOR BRAKE WHEELS.

Application filed September 19, 1921. Serial No. 501,559.

*To all whom it may concern:*

Be it known, that DANIEL THOMAS, citizen of the United States of America, residing at Youngstown, in the county of Mahoning and State of Ohio, has invented certain new and useful Improvements in Belts for Brake Wheels, of which the following is a specification.

This invention relates to certain new and useful improvements in belts for brakewheels, and is an improvement on my Patent No. 825,089. This improvement has for its object to provide a novel form for securing the ends of said belt from all danger of being broken or injured by a sudden application of the belt to a brake-wheel.

Another object of my invention is to provide a novel form of fastening the ends of a belt consisting of a number of elements, each of which is strong and durable when combined to form a belt the longevity of which is materially increased.

Another object of the invention is to provide clamping members for each end, having downturned flanges and an enlarged opening at the extreme end of the clamping members when secured to the ends of said belt.

A still further object of the invention is to provide a plurality of gripping members projecting outward from the inner surface of said gripping members.

Heretofore considerable trouble and expense has been incurred by brake-belts or bands cracking and eventually breaking at the point where they are fastened to the actuating mechanism for operating the belt to brake a wheel.

In the construction of the belt I may use any desirable material, such as is known to the art, but in using the improved end fastening I prefer to use a belt constructed along the lines set forth in my patent above referred to. In this construction I have used leather or raw-hide, fibre or wood, or strands of wire interlaced and woven so as to cushion both the brake band and the wheel when the brake is applied.

This invention aims to eliminate danger to a great degree which is common in operating cranes, lifting molten iron or steel. Should the brake band break the operators or those assisting in the operation about the mill, are in extreme danger.

This form of belt for brake-wheels also adapts itself to the surface of the brake-wheel, which is not the case in the use of steel brake bands and the like.

With the above and other objects in view, which will more readily appear as the nature of the invention is better understood, the same consists in the novel construction, combination, and arrangement of parts to be hereinafter more fully described and claimed.

In order that my invention may be fully understood, reference will herein be had to the accompanying drawing, illustrating the preferred embodiment of my invention, and throughout the several views of which like numerals of reference designate the corresponding parts.

Figure 1 is a side elevation of a brakewheel and my improved brake band or belt.

Figure 2 is a detail sectional view of the end portions of said belt.

Figure 3 is a cross-section of the end portion of my improved brake band or belt.

Figure 4 is a detail view showing the strands of wire in position on one of the clamping members.

Figure 5 is a detail view.

To put my invention into practice, I construct a belt 1 which may operate upon a wheel 2. As this belt 1 is constructed of a plurality of materials, including strands of wire, I have arranged a means for securing the same. In doing this I have provided an outer clamping member 3, and an inner clamping member 4. This clamping member 3 is provided at its extreme outer end 5 with an enlargement to be used in bending in the strand ends 6 of the strands of wire and wires so as to form a wedge shaped end within this extreme outer end 5 which is enlarged so as to properly hold the same.

By referring to Figure 3 it will be seen I have provided downturned flanges 7 formed on the edges of the clamping members 3 and 4. These clamping members 3 and 4 are securely held in engagement by means of rivets 8 and a plurality of gripping members 9 projecting outward from the inner surface of said clamping members 3 and 4.

By referring to Figure 4 is will be seen that the cables 10 are constructed in such a way as to provide stretching characteristics.

It is thought from the foregoing that the construction, operation and advantages of the herein described belt and ends for the same, will be apparent without further description. It is, however, desirable to pour babbitt or other metal into the extreme outer end 5 after the strand ends 6 have been doubled in, thereby making a wedge shaped end, which securely holds the same from slipping within the clamping members 3 and 4.

What I claim:

1. A combination of a brake band of the type described consisting of leather, fibre, steel cables and wires, the same being sinuously arranged with two clamping members riveted to both ends, flanges formed on the edges of the said clamping members, an enlarged end on said clamping members, and a plurality of gripping members projecting from the inner surfaces of said clamping members, substantially as described.

2. In a device of the class described, two clamping members adapted to be riveted to belt ends, flanges formed on the edges of said clamping members, an enlarged end on said clamping members, and means for securing inturned portions of the belt ends, substantially as described for the purpose set forth.

In testimony whereof I affix my signature.

DANIEL THOMAS.

Witnesses:
MARTHA B. McCARTNEY,
C. A. HARPMAN.